2,898,361
PREPARATION OF ORGANODISILOXANE ESTERS

Garrett H. Barnes, Jr., Pittsburgh, Pa., assignor to Dow Corning Corporation, Midland, Mich., a corporation of Michigan No Drawing. Application June 26, 1958
Serial No. 744,686

7 Claims. (Cl. 260—448.2)

The present invention relates to a process for the preparation of organodisiloxane esters.

More specifically, this invention relates to a process which comprises reacting (I) a compound of the formula $[R_2R'SiOCH_2CHZ(CH_2)_nR_2Si]_2O$, where R is selected from the group consisting of methyl, ethyl, and phenyl radicals, R' is selected from the group consisting of methyl and ethyl radicals, Z is selected from the group consisting of H and a methyl radical, and n is an integer of from 1 to 2 inclusive, with (II) a monocarboxylic acid; by contacting (I) and (II) in a liquid phase.

The reaction which takes place in the defined process can best be illustrated by the following equation:

$$[R_2R'SiOCH_2CHZ(CH_2)_nR_2Si]_2O + 2R''COOH \rightarrow [R''COOCH_2CHZ(CH_2)_nR_2Si]_2O + (R_2R'(Si)_2O + H_2O$$

Compound (I) above can be prepared by the reaction of $(R_2HSi)_2O$ with $CH_2=CZ(CH_2)_nOSiR_2R'$ in the presence of chloroplatinic acid as a catalyst. This reaction is preferably carried out at 50 to 180° C., using about $1 \times 10^{-5}$ mol of the acid catalyst per mol of the $(R_2HSi)_2O$ Reactions of this general type are fully illustrated in the Speier and Hook U.S. Patent 2,823,218, issued February 11, 1958. The compound $CH_2=CZ(CH_2)_nOSiR_2R'$ used in the latter reaction is in turn prepared by the conventional reaction of the appropriate unsaturated alcohol with the appropriate triorganochlorosilane, i.e. the reaction of $CH_2=CZ(CH_2)_nOH$ with $R_2R'SiCl$. For the best possible yields, the latter reaction is carried out either in the presence of a HCl acceptor such as pyridine or in a manner which minimizes the contact of the by-product HCl with the reactants and product.

The monocarboxylic acid reactant employed in this invention can be any monocarboxylic acid, for only the carboxyl group takes place in the reaction. The preferred acids are those of the formula R"COOH where R" represents a monovalent-hydrocarbon, halogenated hydrocarbon, hydroxy substituted hydrocarbon, alkoxy substituted hydrocarbon, aryloxy substituted hydrocarbon, or haloaryloxy substituted hydrocarbon radical. Preferably the R" radicals contain no more than 18 carbon atoms. Examples of suitable hydrocarbon radicals are alkyl (e.g. methyl, ethyl, isopropyl, t-butyl, and octadecyl); aryl (e.g. phenyl, xenyl, naphthyl); aralkyl (e.g. benzyl); alkaryl (e.g. tolyl); alkenyl (e.g. vinyl, allyl, isopropenyl, and octadecenyl); alkynyl (e.g. propynyl) and cycloalkyl (e.g. cyclohexyl). The hydrocarbon radicals illustrated above can be halogenated with chlorine, bromine, fluorine, or iodine (preferably in an amount not exceeding 5 halogen atoms per molecule), and they can be hydroxy substituted radicals, with a preferred maximum of three hydroxy groups per molecule. As noted, the hydrocarbon radicals also can be substituted with alkoxy radicals (preferably 1 to 12 carbon atoms), aryloxy radicals (preferably phenoxy), and haloaryloxy radicals (preferably chloro- or bromophenoxy, with a preferred maximum of five halogen atoms per aryloxy radical).

Illustrative examples of suitable monocarboxylic hydrocarbon acids include the staturated aliphatic acids such as formic, acetic, valeric, methylethylacetic, trimethylacetic, caproic, lauric, and stearic acids; and unsaturated aliphatic and aromatic acids such as benzoic, naphthoic, acrylic, methacrylic, crotonic, isocrotonic, vinylacetic, undecylenic, and oleic acids; along with di- and triolefinic and acetylenic acids such as betavinylacrylic, sorbic, linoleic, linolenic, elaeostearic, and propynoic acids.

Specific examples of suitable hydroxy substituted organic acids are the aliphatic hydroxy acids such as glycolic, lactic, beta-hydroxybutyric, gamma-hydroxybutyric, and 12-hydroxystearic acids; the aromatic hydroxy acids such as salicylic, gallic (3,4,5-trihydroxybenzoic), parahydroxycinnamic, 3,4-dihydroxycinnamic, 5-hydroxynaphthoic, and the various cresotic acids; and alicyclic hydroxy acids such as guinic acid.

Suitable alkoxy, aryloxy, and haloaryloxy substituted acids are, e.g., those in which such a group is present in place of the OH group in the above discussed acids. Specific examples of suitable acids of this type include 2,4-dichlorophenoxyacetic, p-bromophenoxyacetic, trifluoromethylphenoxyacetic, p-iodophenoxyacetic, phenoxyacetic, biphenyloxyacetic, ethoxyacetic, 12 - butoxyoctadecanoic, o-, m-, or p-ethoxybenzoic, o-phenoxybenzoic, and dichlorophenoxybenzoic, acids. Preferably the alkoxy or aryloxy radical, when present, contains less than 13 carbon atoms; and any haloaryloxy radical preferably contains less than 6 halogen atoms.

Any of the halogenated hydrocarbon carboxylic acids can also be used herein, although the chlorinated, fluorinated, or brominated derivatives are preferred. Suitable acids of this type are exemplified by trifluoroacetic, 9,10, 12,13-tetrabromooctadecanoic, alphachloroacrylic, betabromocinnamic, o-, m-, or p-fluoro- or iodobenzoic, and pentabromobenzoic acids.

There is no particular limiting ratio of reactants in the defined reaction. As is obvious from the above description, two mols of the monocarboxylic acid are necessary to react fully with one mol of compound (I). Any excess of either reactant can be present, however, for an excess of the siloxane reactant only leads to partial conversion to ester substituted products, and an excess of the acid reactant only remains an unreacted component in the reaction mass. Ordinarily from 50 to 150% of the theoretical amount of the monocarboxylic acid necessary to fully react with the siloxane reactant (I) will be used, however.

The reaction should be carried out in a liquid phase, and any temperature suitable to provide such a phase can be used. If no catalyst is present the reaction may be very slow at room temperature, particularly when a weak carboxylic acid is the reactant, hence it is often desirable to operate at, e.g., 50° to 150° C. in order to improve the yield of product. These elevated temperatures can also be used to increase the solubility of the carboxylic acid in the organosilicon compound, thus improving the contact between the reactants, or to convert a solid reactant to the liquid state. Mutual solvents such as dioxane or acetone are sometimes advantageously used in order to provide better contact between the reactants, particularly if a solubility problem exists in a given system.

Although catalysts are not essential to obtain a degree of reaction in this invention, they are generally desirable in a commercial process to improve the yield of product and to lower the reaction temperature and time required to obtain a commercially desirable yield. Acids having a dissocation constant of at least 0.01 at 25° C. are suitable for this purpose. Relatively few of the carboxylic acids meet this requirement, but those that do (e.g., dichloroacetic, trichloroacetic, trifluoroacetic, maleic and oxalic acids) can be used either as reactants or as catalysts in the reaction, or they can serve both functions at one time. The definition of suitable acid catalysts is intended to include the strong inorganic acids whose constants are too high to be meaningfully measurable, e.g., sulfuric and hydrochloric acids.

Any acid having the required dissociation constant can be used, and it can be mono- or polybasic. Where a polybasic acid is used, it is the constant for the "first hydrogen" which is controlling in meeting the defined limitation. Examples of suitable catalysts in addition to those mentioned above include iodic, perchloric, nitric, periodic, hydrobromic, hydroiodic, phosphoric, sulfurous, benzenesulfonic, and p-toluenesulfonic acids.

Any amount of the acid catalyst will have some beneficial effect on the reaction, but ordinarily it is desirable to use at least 0.01 percent by weight based on the weight of the organosilicon compound present. In general, from 0.1 to 10 inclusive percent by weight is a preferred amount.

When the defined acid catalysts are used in this invention, a dual result can be obtained. The catalyst not only can promote higher yields of the ester substituted products at a faster rate and at lower temperatures, but can also act as an organosiloxane rearrangement catalyst to promote an equilibrium type of reaction between the $(R_2R'Si)_2O$ and $[R''COOCH_2CHZ(CH_2)nR_2Si]_2O$. The product of such an equilibration is the compound $R''COOCH_2CHZ(CH_2)_nR_2SiOSiR_2R'$. The latter product is, of course, much more easily distilled than the diester formed in the first step of a catalyzed reaction, and hence is of greater utility in situations where a very pure product is needed.

The ester substituted products of the process of this invention are of primary utility, as is well known, for their use as intermediates in the preparation of other polymers by making use of the reactivity of the ester group. When the esters themselves contain aliphatic unsaturation, e.g. as in the acryloxy and methacryloxy esters, the compounds are readily polymerized by heating them in the presence of peroxy-type vinyl polymerization catalysts, e.g. benzoyl peroxide, t-butyl perbenzoate, t-butyl peracetate and the like. The low viscosity of the unpolymerized product gives it utility as an impregnating varnish and as a potting compound for intricate or difficult accessible areas without the need for dilution with an organic solvent. The unsaturated esters produced by this invention can also be copolymerized with organic vinylic type resins, using the conventional vinyl polymerization techniques.

The following examples are illustrative only. All parts are parts by weight unless otherwise specified. The symbols Et, Me and Ph have been used to represent ethyl, methyl and phenyl radicals respectively.

*Example 1*

$Me_3SiOCH_2CH=CH_2$ was produced by introducing allyl alcohol dropwise into a glass helices-packed column under which a 100% excess of $Me_3SiCl$ was being heated at reflux, and distilling the reaction product (B.P. 99° C.). A mixture of 162.9 parts (30% excess) of this allyloxysilane product and sufficient $H_2PtCl_6 \cdot 6H_2O$ as a 0.1 M solution in isopropanol to provide $4.8 \times 10^{-6}$ mol Pt per mol $Me_3SiOCH_2CH=CH_2$ was heated at 90° C., and 64.3 parts $(Me_2HSi)_2O$ was added. Fractional distillation of the reaction mass provided over a 90% yield of $(Me_3SiOCH_2CH_2CH_2Me_2Si)_2O$ B.P. 178°–181°/25 mm. Hg, $R_D$ 0.2940.

A mixture of 69.1 parts (0.175 mol, 0.35 equivalent) of $(Me_3SiOCH_2CH_2CH_2Me_2Si)_2O$, 51 parts (0.7 mol) acrylic acid containing 0.5 part hydroquinone as an inhibitor, 6.02 parts (0.035 mol) p-toluenesulfonic acid, and 0.252 part N-N'-di-2-naphthyl-p-phenylenediamine (a polymerization inhibitor for both the acrylic acid and the expected product) was held at 25° C. The course of the reaction was followed by periodically titrating samples of the mixture with 0.1 N NaOH, and conversion of the acrylic acid was found to be 69.7% in 24 hours, 73.7% in 46 hours, and 98% in 90.5 hours. The mass was washed with water, then with 5% aqueous sodium bicarbonate solution. An additional 0.4 part of the above diamine was added and the material was dried by the azeotropic distillation of the $(Me_3Si)_2O$ which had been formed. An additional 0.8 part of hydroquinone was added, and the material was fractionally distilled under reduced pressure to avoid a pot temperature of any more than 200° C. The distillate contained $(Me_3Si)_2O$, the mono-ester $CH_2=CHCOO(CH_2)_3Me_2SiOSiMe_3$, and the diester $[CH_2=CHCOO(CH_2)_3Me_2Si]_2O$ in a molar ratio of approximately 1:2:1. The products were washed free of hydroquinone, and had the following properties:

Mono-ester: B.P. 127–8° C./25 mm. Hg, $n_D^{25}$ 1.4242, $d_4^{25}$ 0.9043, $R_D$ 0.2823 (theoretical, 0.2822).

Diester: B.P. 148–9° C./2 mm. Hg, $n_D^{25}$ 1.4472, $d_4^{25}$ 0.9764, $R_D$ 0.2733 (theoretical, 0.2728).

Previous attempts to prepare this diester in a distillable form have failed.

*Example 2*

By using methacrylic acid in place of the acrylic acid of Example 1 in the procedure otherwise the same, a final reaction product is obtained which contains $(Me_3Si)_2O$, $CH_2=C(Me)COO(CH_2)_3Me_2SiOSiMe_3$, and $[CH_2=C(Me)COO(CH_2)_3Me_2Si]_2O$ Correspondingly, the use of acetic acid leads to the $CH_3COO(CH_2)_3$-substituted derivatives.

*Example 3*

By starting with methallyl alcohol in place of the allyl alcohol used in Example 1, the compound $Me_3SiOCH_2(Me)C=CH_2$ is produced. Carrying this through the remaining steps of Example 1 leads to the production of the corresponding $CH_2=CHCOOCH_2CHMeCH_2$-substituted mono- and diesters. Starting with allyl carbinol in place of allyl alcohol produces the corresponding $CH_2=CHCOO(CH_2)_4$ substituted mono- and diesters as final products.

*Example 4*

The procedure of Example 1 was repeated, using 6 parts of concentrated $H_2SO_4$ in place of the p-toluenesulfonic acid, and the same products were obtained.

*Example 5*

When glacial acetic acid and $(Me_3SiOCH_2CH_2CH_2Me_2Si)_2O$ are mixed in a molar ratio of 2:1 and heated at 100° C. for 48 hours with no added catalyst present, the products obtained are $(Me_3Si)_2O$ and $[CH_3COO(CH_2)_3Me_2Si]_2O$.

*Example 6*

$Me_2PhSiOCH_2CH=CH_2$, $MePh_2SiOCH_2CH=CH_2$, and $Et_3SiOCH_2CH=CH_2$ were produced by reacting $Me_2PhSiCl$, $MePh_2SiCl$ or $Et_3SiCl$ with allyl alcohol in the presence of an excess of the theoretical quantity of pyridine sufficient to react with the HCl formed. The three allyloxy substituted silanes were respectively reacted with $(MePhHSi)_2O$ in the presence of $H_2PtCl_6 \cdot 6H_2O$ as in Example 1. When the respective products are reacted with acrylic acid as in Example 1, the final products are the diesters of the formula $(YPhMeSi)_2O$; the mono-esters of the formulas $YPhMeSiOSiMe_2Ph$, $YPhMeSiOSiPh_2Me$ and $YPhMeSiOSiEt_3$ (Y being used to represent the acryloxypropyl radical); and $(Me_2PhSi)_2O$, $(MePh_2Si)_2O$, and $(Et_3Si)_2O$ respectively.

That which is claimed is:

1. A process for the preparation of organodisiloxane esters which comprises reacting (I) a compound of the formula $[R_2R'SiOCH_2CHZ(CH_2)_nR_2Si]_2O$, where R is selected from the group consisting of methyl, ethyl, and phenyl radicals, R' is selected from the group consisting of methyl and ethyl radicals, Z is selected from the group consisting of H and a methyl radical, and $n$ is an integer of from 1 to 2 inclusive, with (II) a monocarboxylic acid; by contacting (I) and (II) in a liquid phase.

2. A process in accordance with claim 1 wherein the reaction is conducted in the presence of an acid catalyst for the reaction, said acid catalyst having a dissociation constant of at least 0.01 at 25° C. and being present in an amount of at least 0.01% by weight based upon the weight of the organosilicon compound present.

3. A process for the preparation of organodisiloxane esters which comprises reacting a disiloxane of the formula $[(CH_3)_3SiOCH_2CH_2CH_2(CH_3)_2Si]_2O$ with a monocarboxylic acid of the formula R"COOH, where R" is selected from the group consisting of monovalent-hydrocarbon, halogenated hydrocarbon, hydroxy substituted hydrocarbon, alkoxy substituted hydrocarbon, aryloxy substituted hydrocarbon, and haloaryloxy substituted hydrocarbon radicals, by contacting the disiloxane with the monocarboxylic acid in a liquid phase in the presence of from 0.1 to 10 inclusive percent by weight of a catalyst for the reaction which is an acid having a dissociation constant of at least 0.01 at 25° C.

4. A process in accordance with claim 3 wherein the catalyst is selected from the group consisting of sulfuric acid and p-toluenesulfonic acid.

5. A process in accordance with claim 3 wherein the monocarboxylic acid is acrylic acid.

6. A process in accordance with claim 3 wherein the monocarboxylic acid is methacrylic acid.

7. A process in accordance with claim 3 wherein the monocarboxylic acid is acetic acid.

References Cited in the file of this patent

UNITED STATES PATENTS 2,770,633   Sommer ---------------- Nov. 13, 1956